United States Patent

Monzaki et al.

[11] Patent Number: 5,813,732
[45] Date of Patent: Sep. 29, 1998

[54] STABILITY CONTROL DEVICE OF VEHICLE OPERATIVE AGAINST SPIN AND DRIFT-OUT IN HARMONY

[75] Inventors: Shirou Monzaki, Mishima; Shoji Inagaki, Numazu, both of Japan

[73] Assignee: Toyota Jidosha Kabushiki Kaisha, Toyota, Japan

[21] Appl. No.: 723,757

[22] Filed: Sep. 30, 1996

[30] Foreign Application Priority Data

Oct. 6, 1995 [JP] Japan ................................. 7-286416

[51] Int. Cl.$^6$ ............................................. B60T 8/58
[52] U.S. Cl. ........................................ 303/146; 303/186
[58] Field of Search .................................. 303/146, 147, 303/148, 186; 364/426.01–426.03

[56] References Cited

U.S. PATENT DOCUMENTS

| | | | |
|---|---|---|---|
| 3,706,352 | 12/1972 | Ferguson et al. | 303/146 X |
| 4,809,181 | 2/1989 | Ito et al. | 303/146 X |
| 5,134,352 | 7/1992 | Matsumoto et al. | 303/146 X |
| 5,188,434 | 2/1993 | Ruf et al. . | |
| 5,251,137 | 10/1993 | Chin et al. | 364/426.02 |
| 5,267,783 | 12/1993 | Inoue et al. . | |
| 5,328,255 | 7/1994 | Isella | 303/113.2 X |
| 5,332,300 | 7/1994 | Hartmann et al. . | |
| 5,474,369 | 12/1995 | Inagaki et al. | 303/146 |

FOREIGN PATENT DOCUMENTS

A-6-24304  2/1994  Japan .

*Primary Examiner*—Peter M. Poon
*Attorney, Agent, or Firm*—Oliff & Berridge, PLC

[57] ABSTRACT

A stability control device of a vehicle has a unit for estimating a liability of the vehicle body to spin for producing a spin quantity which generally increases along with increase of the spin liability; a unit for estimating a liability of the vehicle body to drift-out for producing a drift-out quantity which generally increases along with increase of the drift-out liability; a brake for selectively applying a variable braking force to each of wheels; and a control unit for controlling the brake so as to apply a variable braking force to a selected one or ones of the wheels for suppressing the vehicle body against spin and/or drift-out when the vehicle is driven along a curved course, wherein the control unit controls the brake such that a first braking force is applied to one of the front wheels located at the outside of turn of the vehicle along the curved course according to an increase of the spin quantity, and a second braking force is applied to at least one of the rear wheels according to an increase of the drift-out quantity, the first braking force being decreased according to a simultaneous application of the second braking force to the at least one rear wheel.

4 Claims, 6 Drawing Sheets

STABILITY CONTROL DEVICE OF VEHICLE OPERATIVE AGAINST SPIN AND DRIFT-OUT IN HARMONY

BACKGROUND OF THE INVENTION

1. Field of the Invention

The present invention relates generally to a behavior control of a vehicle such as an automobile for improving the running stability thereof, and more particularly, to a stability control device for more desirably suppressing the vehicle against spin in harmony with suppressing the vehicle against drift-out.

2. Description of the Prior Art

It is well known that the automobiles and the like vehicles are, when unduly operated, liable to spin and/or drift-out, because the side force applied to the vehicle body as a centrifugal force can increase with no limit along with increase of vehicle speed and steering angle, while the tire grip force for holding and steering the vehicle along the road surface against the side force is limited, particularly to be less on a slippery wet road.

Various endeavors have been made to suppress the automobiles and the like vehicles against spin and/or drift-out. An example is shown in Japanese Patent Laid-open Publication 6-24304, according to which controlled braking forces are applied to respective wheels by a feedback control system such that the actual yaw rate of the vehicle body conforms to a target yaw rate calculated based upon running conditions of the vehicle including steering condition.

In similar endeavors for further improving the vehicle stability against spin and also against drift-out, the present inventors have particularly noted the interaction between a spin suppress control and a drift-out suppress control of the four wheeled vehicles.

In four wheeled vehicles, it is effective for suppressing the vehicle against a spin during turning to apply a braking force to a front wheel at the outside of the turn, so as thereby to generate an anti-spin moment in the vehicle body around the braked front wheel. However, when the front wheel at the outside of the turn is braked for suppressing the vehicle against a spin, the total vector of the side grip force to act between the tire of the front wheel at the outside of the turn and the road surface resulting from a vector addition of a vector component due to the centrifugal side force and a vector component due to the deceleration by the braking increases often to exceed the so-called friction circle representing the maximum friction force available between the tire and the road surface, thereby causing a drift-out of the vehicle.

On the other hand, as is well known in the art, the drift-out is effectively suppressed by braking the vehicle, particularly at the rear wheels, so that the vehicle is decelerated to decrease the centrifugal force applied thereto, and further, when the rear wheels are braked, the lateral vector component of the tire grip force of the rear wheels is decreased by an addition of a longitudinal vector component generated by the braking, as the total vector of the tire grip force available is limited and saturates in all directions as defined by the friction circle, thereby allowing the rear wheels to slip outside of the turn, thus forwarding the running vehicle toward the inside of the turn. However, such a rear wheel braking for the drift-out suppress control is inductive of a spin.

SUMMARY OF THE INVENTION

In view of the above inconvenience of interaction between the spin and the drift-out of the vehicle, it is a primary object of the present invention to provide a more improved stability control device of a vehicle such as an automobile which can effectively suppress the vehicle against spin and drift-out with a desirable harmony between these mutually contradictory controls.

According to the present invention, the above-mentioned object is accomplished by a stability control device of a vehicle having a vehicle body, and front left, front right, rear left and rear right wheels, comprising:

a means for estimating a liability of the vehicle body to spin for producing a spin quantity which generally increases along with increase of the spin liability;

a means for estimating a liability of the vehicle body to drift-out for producing a drift-out quantity which generally increases along with increase of the drift-out liability;

a brake means for selectively applying a variable braking force to each of said wheels; and a control means for controlling said brake means so as to apply a variable braking force to a selected one or ones of said wheels for suppressing the vehicle body against spin and/or drift-out when the vehicle is driven along a curved course, wherein said control means controls said brake means such that a first braking force is applied to one of said front wheels located at the outside of a turn of the vehicle along the curved course according to an increase of said spin quantity, and a second braking force is applied to at least one of said rear wheels according to an increase of said drift-out quantity, said first braking force being decreased according to a simultaneous application of said second braking force to said at least one rear wheel.

In the stability control device of the above-mentioned construction, said first braking force may be applied to the front wheel at the outside of the turn at an uprise rate which is lowered from a first value adopted when said second braking force is not simultaneously applied to a second value adopted when said second braking force is simultaneously applied.

Further, in the stability control device of the above-mentioned construction, said first braking force may be applied to the front wheel at the outside of the turn starting earlier against the increase of said spin quantity when said second braking force is simultaneously applied than when said second braking force is not simultaneously applied.

Further, in the stability control device of the above-mentioned construction, said control means may calculate an overall slip ratio of said front left, front right, rear left and rear right wheels to be effected therein by braking according to the magnitude of said drift-out quantity, said control means also calculating a slip ratio of the front wheel at the outside of the turn to be effected therein by braking according to the magnitude of said spin quantity, said control means controlling said brake means such that the front wheel at the outside of the turn is braked to effect the slip ratio calculated therefor, while said at least one rear wheel is braked to effect a difference of said overall slip ratio relative to said slip ratio calculated for the front wheel at the outside of the turn.

BRIEF DESCRIPTION OF THE DRAWING

In the accompanying drawing.

DESCRIPTION OF THE EMBODIMENT

In the following, the present invention will be described in more detail in the form of a preferred embodiment with reference to the accompanying drawings.

Figure 1:
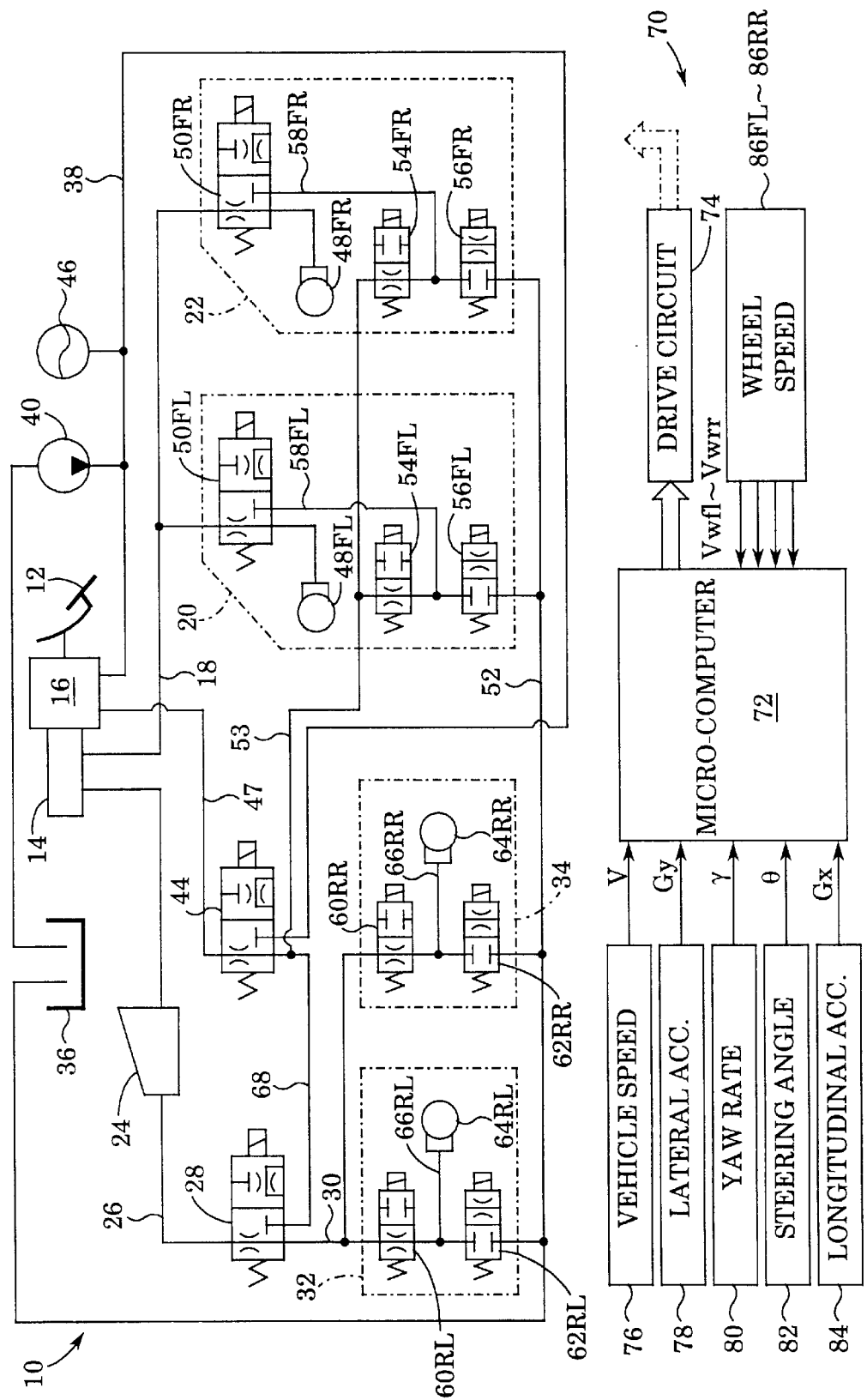
FIG. 1 is a diagrammatic illustration of hydraulic circuit means and electrical control means of an embodiment of the stability control device according to the present invention.

First, referring to FIG. 1 showing diagrammatically an embodiment of the stability control device of the present invention with regard to the constructions of its hydraulic circuit means and its electric control means, the hydraulic circuit means generally designated by 10 comprises a conventional manual brake pressure source means including a brake pedal 12 to be stepped on by a driver, a master cylinder 14 adapted to generate a master cylinder pressure according to the stepping-on of the brake pedal 12, and a hydro-booster 16 which generates a booster pressure.

The hydraulic means 10 further comprises a powered brake pressure source means including a reservoir 36 and a brake fluid pump 40 which delivers a pressurized brake fluid to a passage 38 to which an accumulator 46 is connected, so that a stabilized accumulator pressure for the automatic brake control described hereinbelow is available in the passage 38. The accumulator pressure is also supplied to the hydro-booster 16 as a pressure source for generating a booster pressure which has substantially the same pressure performance as the master cylinder pressure depending upon the stepping-on performance of the brake pedal 12 but is capable to maintain such a pressure performance while the brake fluid is being consumed by a series connection of a normally open type on-off valve and a normally closed type on-off valve to obtain a desired brake pressure, as described hereinbelow.

A first passage 18 extends from a first port of the master cylinder 14 to a front left wheel brake pressure control means 20 and a front right wheel brake pressure control means 22. A second passage 26, including a proportioning valve 24, extends from a second port of the master cylinder 14 toward both a rear left wheel brake pressure control means 32 and a rear right wheel brake pressure control means 34, via a 3-ports-2-positions changeover type electromagnetic control valve 28, an outlet port of which is connected, via a common passage 30, with the rear left and right wheel brake pressure control means 32 and 34.

The brake pressure control means 20 and 22 of the front left and front right wheels include wheel cylinders 48FL and 48FR for applying variable braking forces to the front left and front right wheels, 3-ports-2-positions changeover type electromagnetic control valves 50FL and 50FR, and series connections of normally open type electromagnetic on-off valves 54FL and 54FR and normally closed type electromagnetic on-off valves 56FL and 56FR, respectively, said series connections of the normally open type on-off valves and the normally closed type on-off valves being connected between a passage 53 adapted to be supplied with the accumulator pressure of the passage 38 or the booster pressure from the hydro-booster through a 3-ports-2-positions changeover type electronic control valve 44 the operation of which is described hereinbelow, and a return passage 52 connected to the reservoir 36. A mid point of the series connection of the on-off valves 54FL and 56FL is connected to a port of the control valve 50FL by a connection passage 58FL, and a mid point of the series connection of the on-off valves 54FR and 56FR is connected to a port of the control valve 50FR by a connection passage 58FR.

The brake pressure control means 32 and 34 of the rear left and rear right wheels include wheel cylinders 64RL and 64RR for applying braking force to the rear left and rear right wheels, respectively, and series connections of normally open type electromagnetic on-off valves 60RL and 60RR and normally closed type electromagnetic on-off valves 62RL and 62RR, said series connections of normally open type on-off valves and the normally closed type on-off valves being connected between the passage 30 connected to the one outlet port of the control valve 28 and the return passage 52. A mid point of the series connection of the on-off valves 60RL and 62RL is connected to a wheel cylinder 64RL for applying braking force to the rear left wheel by a connection passage 66RL, and a mid point of the series connection of the on-off valves 60RR and 62RR is connected to a wheel cylinder 64RR for applying braking force to the rear right wheel by a connection passage 66RR.

The control valves 50FL and 50FR are respectively switched over between a first position for connecting the wheel cylinders 48FL and 48FR with the manual brake pressure passage 18, while disconnecting them from the connection passages 58FL and 58FR, respectively, as in the state shown in the figure, and a second position for disconnecting the wheel cylinders 48FL and 48FR from the passage 18, while connecting them with the connection passages 58FL and 58FR, respectively.

The control valve 28 is switched over between a first position for connecting the passage 30 for both of the series connection of the on-off valves 60RL and 62RL and the series connection of the on-off valves 60RR and 62RR with the manual brake pressure passage 26 as in the state shown in the figure, and a second position for disconnecting the passage 30 from the passage 26, while connecting it with a passage 68 connected to one outlet port of the changeover control valve 44 together with the passage 53, so as to be connected with either a delivery port of the hydro-booster 16 or the accumulator pressure passage 38, according to whether the control valve 44 is in a first position such as shown in the figure or a second position opposite thereto.

When the control valves 50FL, 50FR and 28 are in the first position as in the state shown in the figure, the wheel cylinders 48FL, 48FR, 64RL, 64RR are connected with the manual brake pressure passages 18 and 26 so as to be supplied with the pressure of the master cylinder 14, thereby enabling the driver to apply a braking force to each wheel according to the stepping-on of the brake pedal 12. When the control valve 28 is changed over to the second position, with the control valve 44 being kept at the shown first position, the rear wheel cylinders 64RL and 64RR are supplied with the booster pressure according to the stepping-on of the brake pedal from the hydro-booster 16. When the control valves 50FL, 50FR, 28 and 44 are changed over to the second position, the wheel cylinders 48FL, 48FR, 64RL, 64RR are supplied with the powered accumulator brake pressure of the passage 38 under the control of the normally open on-off valves 54FL, 54FR, 60RL, 60RR and the normally closed type on-off valves 56FL, 56FR, 62RL, 62RR according to the ratio of the open state of the corresponding normally open type on-off valve and the closed state of the corresponding normally closed type on-off valve, i.e. the so-called duty ratio, apart from the stepping-on of the brake pedal 12.

The changeover control valves 50FL, 50FR, 28, 44, normally open type on-off valves 54FL, 54FR, 60RL, 60RR, normally closed type on-off valves 56FL, 56FR, 62RL, 62RR and the pump 40 are all controlled by an electric control means 70 as described in detail hereinbelow. The electric control means 70 consists of a micro-computer 72 and a driving circuit means 74. Although not shown in detail in FIG. 1, the micro-computer 72 may have a general construction including a central processing unit, a read only memory, a random access memory, input and output port means and a common bus interconnecting these functional elements.

The input port means of the micro-computer 72 is supplied with a signal showing vehicle speed V from a vehicle speed sensor 76, a signal showing lateral acceleration Gy of the vehicle body from a lateral acceleration sensor 78 mounted substantially at a mass center of the vehicle body, a signal showing yaw rate γ of the vehicle body from a yaw rate sensor 80, a signal showing steering angle θ from a steering angle sensor 82, a signal showing longitudinal acceleration Gx of the vehicle body from a longitudinal acceleration sensor 84 mounted substantially at the mass center of the vehicle body, and signals showing wheel speed (wheel circumferential speed) Vwfl, Vwfr, Vwrl, Vwrr of front left and right wheels and rear left and right wheels not shown in the figure from wheel speed sensors 86FL–86RR, respectively. The lateral acceleration sensor 78, yaw rate sensor 80 and steering angle sensor 82 detect the lateral acceleration, yaw rate and steering angle, respectively, as being positive when the vehicle makes a left turn, and the longitudinal acceleration sensor 84 detects longitudinal acceleration as being positive when the vehicle is accelerated in the forward direction. In general, in the following analyses, the parameters which are distinctive of the direction of turn of the vehicles are each assumed to be positive when the turn is counter-clockwise and negative when the turn is clockwise, as viewed from the top of the vehicle.

Figure 2:
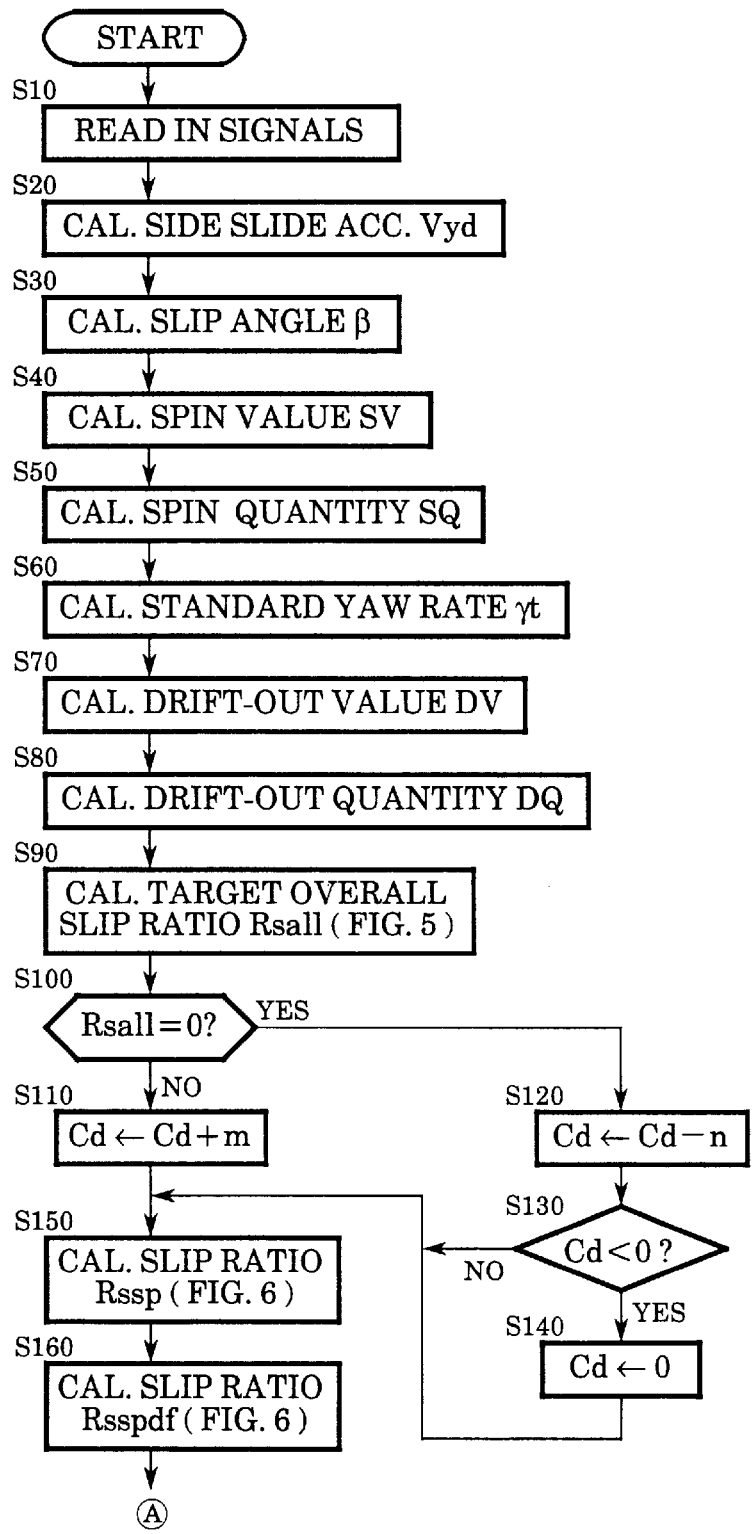
FIGS. 2 and 3 show, in combination, a flowchart of an embodiment of the stability control routine conducted by the stability control device according to the present invention.
Figure 3:
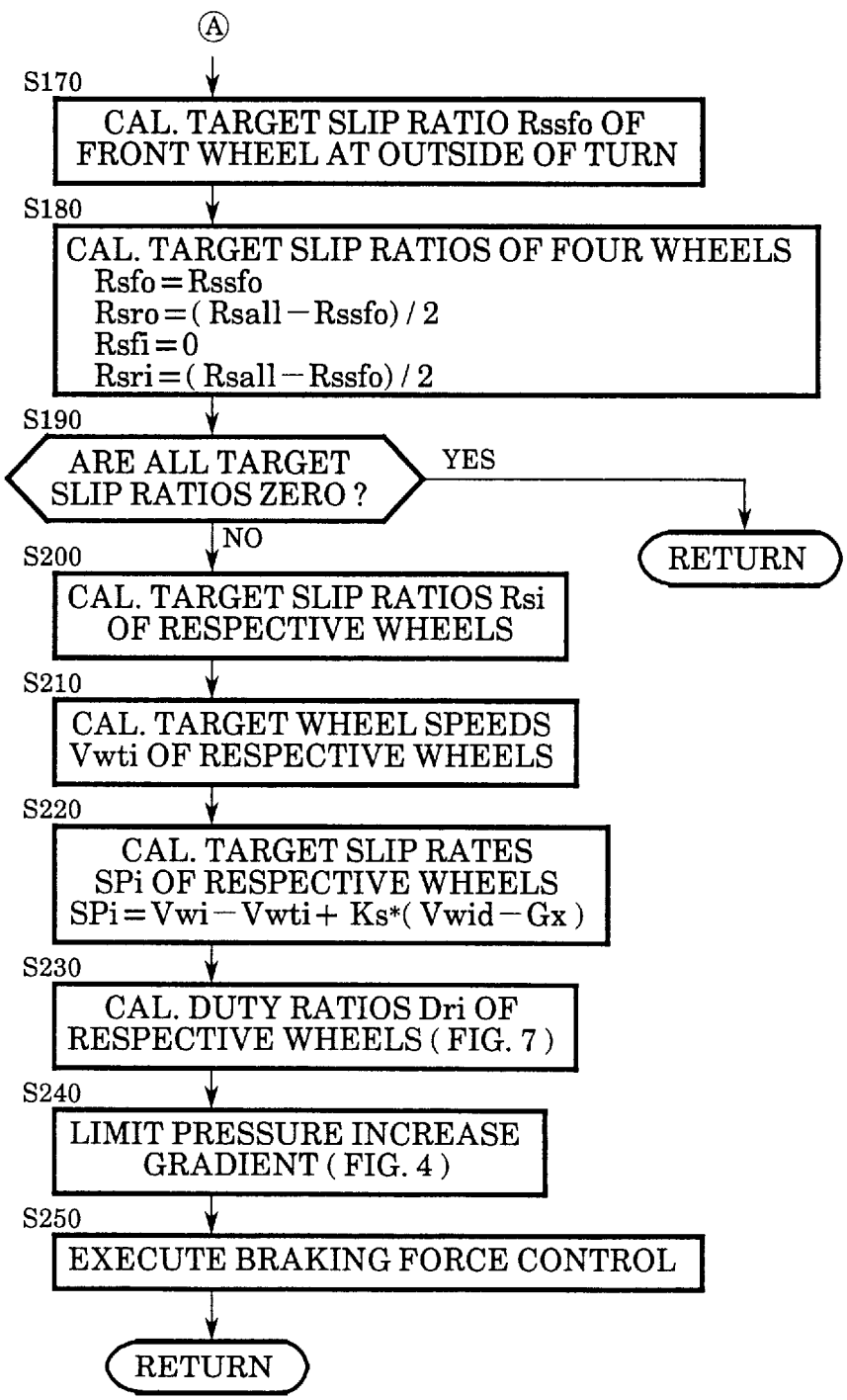
Figure 4:
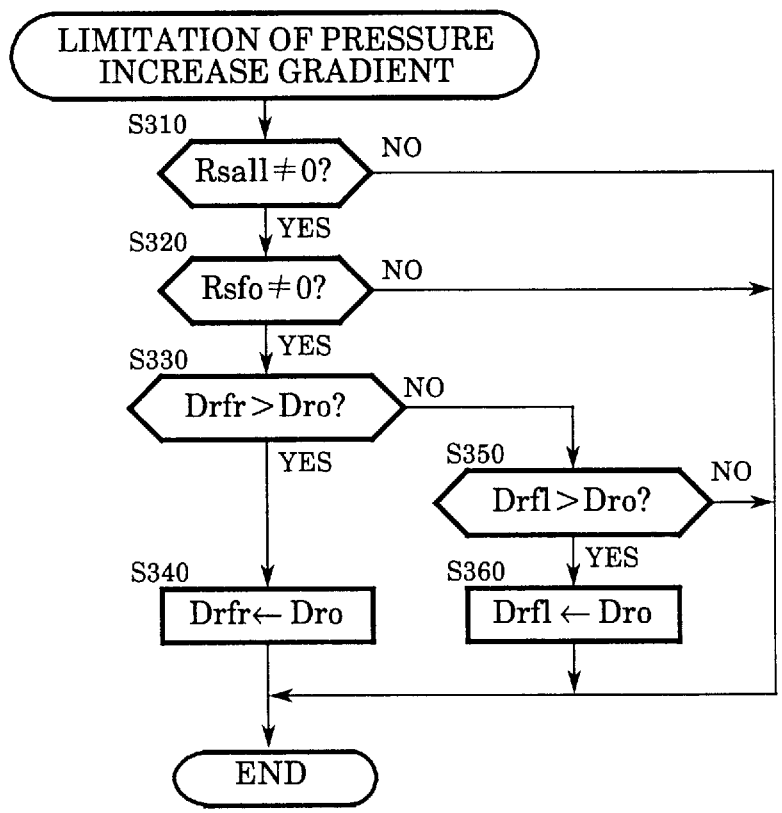
FIG. 4 is a flowchart showing a routine for limiting the pressure increase gradient incorporated in the routine of FIGS. 2 and 3.

The read only memory of the micro-computer 72 stores such flowcharts as shown in FIGS. 2, 3 and 4 and such maps as shown in FIGS. 5–8. The central processing unit conducts various calculations based upon the parameters detected by the above-mentioned sensors according to those flowcharts and maps as described hereinbelow, so as to obtain the spin quantity and the drift-out quantity for judging and estimating spinning state and drifting out state of the vehicle, respectively, and controls the turn stability of the vehicle based upon the estimated quantities, particularly to suppress the vehicle against spin and drift-out, by selectively applying a variable braking force to each of the wheels.

In the following, the vehicle stability control device of the present invention will be described in the form of an embodiment of its control operation with reference to FIGS. 2–9. The control according to the flowchart shown in FIGS. 2 and 3 is started by a closure of an ignition switch not shown in the figure and carried out repetitively at a predetermined time interval such as tens of micro-seconds.

In step 10 (Step is abbreviated as "S" in the flow chart.), the signals including vehicle speed V from the vehicle speed sensor 76 and others are read in. In step 20, the difference between the actual lateral acceleration Gy detected by the lateral acceleration sensor 78 and a product of vehicle speed V and yaw rate γ is calculated to obtain side slide acceleration Vyd of the vehicle body as Vyd=Gy−V*γ. Then, integrating Vyd on time basis, side slide velocity Vy is obtained. In step 30, slip angle of the vehicle body β is calculated as a ratio of the side slide velocity Vy to the longitudinal velocity Vx of the vehicle body (=vehicle speed V), as β=Vy/Vx.

In step 40, taking two positive constants K1 and K2 appropriately, a value herein called spin value SV is calculated as a linear sum of the slip angle β and the side slide acceleration Vyd, such as SV=K1*β+K2*Vyd. In step 50, the direction of turn of the vehicle is judged from the sign of yaw rate γ, and a parameter herein called spin quantity SQ is determined to be equal to SV when the spin value SV is positive, and to be equal to −SV when the spin value SV is negative. Or, the spin quantity may be determined to be more sensitive about the variety of turn behavior of the vehicle such that, when the spin value SV is positive in conformity with the yaw rate γ being positive, the spin quantity SQ is equal to SV but if the spin value SV is negative against the positive yaw rate γ, the spin quantity SQ is made zero, and similarly, when the spin value SV is negative in conformity with the yaw rate γ being negative, the spin quantity SQ is equal to −SV but if the spin value SV is positive against the negative yaw rate γ, the spin quantity SQ is made zero. As will be appreciated, the spin quantity SQ is a parameter which shows the liability of the vehicle body to spin.

In step 60, a target yaw rate γ c is calculated according to the following formula 1, wherein H is the wheel base and Kh is an appropriate stability factor, and then a standard yaw rate γ t is calculated according to the following formula 2, wherein s is the Laplace operator and T is an appropriate time constant therefor.

$$\gamma c = V^* \theta / (1 + Kh^* V^2)^* H \qquad (1)$$

$$\gamma t + \gamma c / (1 + T^* s) \qquad (2)$$

The calculation of the target yaw rate γ c may be modified to incorporate an influence of the lateral acceleration Gy.

In step 70, a value herein called drift-out value DV is calculated according to the following formula 3 or 4, the latter incorporating an influence of the ratio of wheel base H to vehicle speed V.

$$DV = (\gamma t - \gamma) \qquad (3)$$

$$DV = H^*(\gamma t - \gamma)/V \qquad (4)$$

In step 80, a parameter herein called drift-out quantity DQ is determined to be equal to DV when the vehicle is making a left turn, and to be equal to −DV when the vehicle is making a right turn. When the drift-out quantity would nevertheless get negative, it is made zero. As will be appreciated, the drift-out quantity DQ is a parameter which shows the liability of the vehicle body to drift-out.

Figure 5:
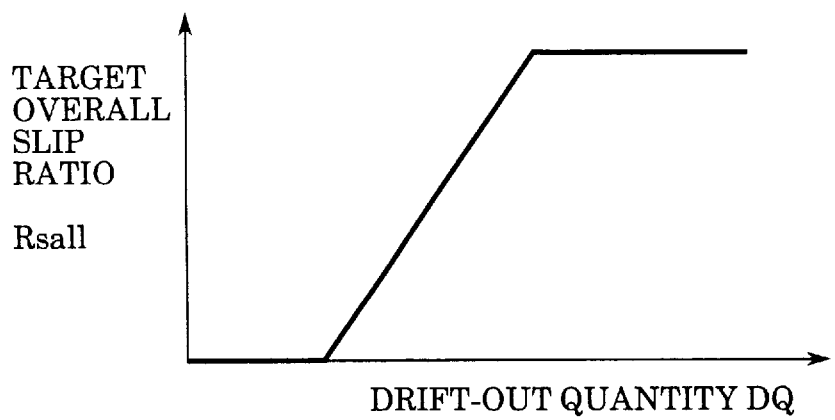
FIG. 5 is a map showing the relationship between the drift-out quantity DQ and the target overall slip ratio Rsall to be incorporated in the routine of FIGS. 2 and 3.

In step 90, referring to a map such as shown in FIG. 5, a value of target overall slip ratio Rsall is read out against a value of the drift-out quantity DQ. The target overall slip ratio Rsall is a target value for the overall slip ratio to be born by the four wheels for suppressing the vehicle against drift-out by means of decreasing vehicle speed, though the braking of the rear wheels can have an additional effect of letting the rear wheels slide outside of the turn.

In step 100, it is judged if Rsall is zero or not. If the answer is no, i.e. if the drift-out quantity DQ is at a substantial value higher than a certain threshold value, the control proceeds to step 110, where a count value Cd (reset to zero at the start of the control) is increased by an increment number "m", and then the control proceeds to step 150. Step 110 is provided to make a certain gradual changeover from a first control performance to a second control performance, as will be appreciated hereinbelow with reference to formula 5. Similarly, steps 120, 130 and 140 are provided in order to obtain a certain gradual changeover from said second control performance to said first control performance when the drift-out quantity has subsided, as will be also apparent hereinbelow.

Figure 6:
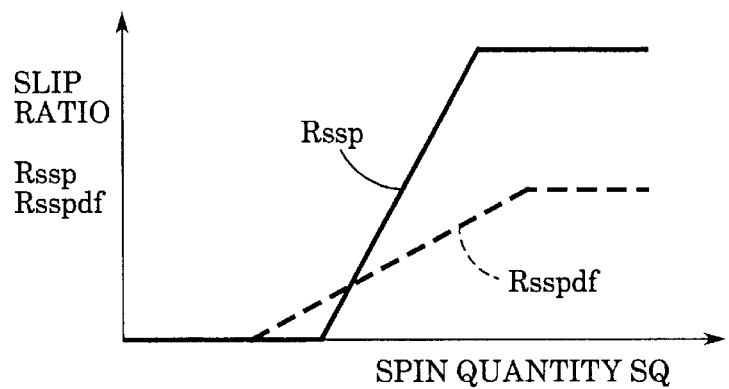
FIG. 6 is a map showing the relationship between the spin quantity SQ and the slip ratios Rssp and Rsspdf to be incorporated in the routine of FIGS. 2 and 3.

In steps 150 and 160, referring to a map such as shown in FIG. 6 with a current value of the spin quantity SQ, corresponding values of Rssp and Rsspdf are read out, wherein Rssp is a value representative of a braking force application performance for a front wheel at the outside of the turn when the vehicle behavior is controlled against a spin with low liability of drift-out, while Rsspdf is a value representative of a braking force application performance for a front wheel at the outside of the turn when the vehicle behavior is controlled against a spin with high liability of drift-out. In step 170, a target slip ratio Rssfo for a front wheel at the outside of the turn is calculated according to the following formula 5, wherein Kd is an appropriately determined count limit in connection with the design of value of increment Cd:

$$Rssfo = Rssp * (Kd - Cd)/Kd + Rsspdf * Cd/Kd \quad (5)$$
$$= Rssp - (Rssp - Rsspdf) * Cd/Kd$$

It will be appreciated that, by the values of m, n and Kd being appropriately determined, the performance of Rssfo is changed over between Rssp and Rsspdf at a desired speed.

In step 180, target slip ratios for the front wheel at the outside of the turn, the rear wheel at the outside of the turn, the front wheel at the inside of the turn and the rear wheel at the inside of the turn, Rsfo, Rsro, Rsfi and Rsri, are calculated according to the following formulae 6:

$$Rsfo=Rssfo$$
$$Rsro=(Rsall-Rssfo)/2$$
$$Rsfi=0$$
$$Rsri=(Rsall-Rssfo)/2 \quad (6)$$

Although in the above embodiment the rear left and rear right wheels are adapted to be applied with the same magnitude of braking force as shared equally therebetween, the sharing of the braking force between the two rear wheels may be changed between 100% vs. 0% and 0% vs. 100%. As will be appreciated from the difference between the performance of Rssp expressed by a solid line and that of Rsspdf expressed by a broken line in the map of FIG. 6, by the target slip ratio Rssfo for the front wheel at the outside of the turn being calculated according to formula 5, when the spin quantity SQ exceeds a substantial level, while the drift-out quantity DQ is not at a substantial level, Rssfo is calculated according to the performance of Rssp to apply a relatively strong braking force to the front wheel at the outside of the turn, whereby the stability control is carried out effectively to suppress the vehicle against a spin. However, if the drift-out quantity DQ is also at a substantial level, Rssfo is calculated according to the performance of Rsspdf, whereby the value of Rsfo is attenuated as appreciated by the contrast of curves Rsspdf to Rssp. In the latter case, however, the rear wheels are applied with a substantial braking due to the substantial value of Rsall.

Further, as will be appreciated from FIG. 6, Rsspdf is adapted to provide a substantial value starting at an earlier stage of increase of the spin quantify SQ.

In step 190, it is judged if the target ratios Rsfo, Rsro, Rsfi and Rsri are all zero. If the answer is no, the control proceeds to step 200, and the direction of turn is determined according to whether the yaw rate γ is positive or negative, so as to determine the wheels at the outside and inside of the turn. (If the answer of step 190 is yes, there will be no need to continue the control operation.) Then, the target slip ratios for the front left and right and rear left and right wheels are determined by either the following formulae 7 or 8 according to whether the vehicle is making a left turn or a right turn:

$$Rsfl=Rsfi$$
$$Rsfr=Rsfo$$
$$Rsrl=Rsri$$
$$Rsrr=Rsro \quad (7)$$
$$Rsfl=Rsfo$$
$$Rsfr=Rsfi$$
$$Rsrl=Rsro$$
$$Rsrr=Rsri \quad (8)$$

In Step 210, taking Vb as a reference vehicle speed (for example, the wheel speed of the front wheel at the inside of the turn), target wheel speeds Vwti (i=fl, fr, rl, rr) of the respective wheels are calculated according to the following formula 9:

$$Vwti=Vb*(100-Rsi)/100 \quad (9)$$

In step 220, by taking Vwid as accelerations of the respective wheels (differentiation of Vwi) and Ks as an appropriate positive constant, target slip rates SPi of the respective wheels are calculated by the following formula 10:

$$SPi=Vwi-Vwti+Ks*(Vwid-Gx) \quad (10)$$

Figure 7:
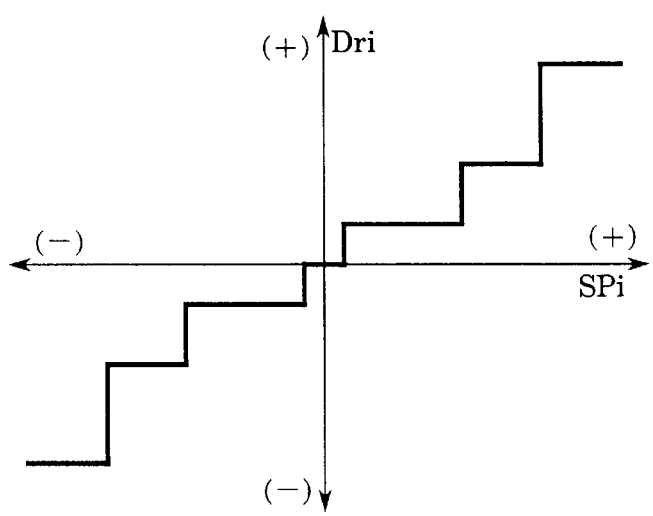
FIG. 7 is a map showing the relationship between the slip rate SPi and the duty ratio Dri to be incorporated in the routine of FIGS. 2 and 3.

In step 230, referring to a map such as shown in FIG. 7, duty ratios Dri for the respective wheels are calculated to correspond to the values of SPi, to determine the on-off durations of the on-off valves 54FL vs. 56FL, 54FR vs. 56FR, 60RL vs. 62RL and 60RR vs. 62RR.

In step 240, the duty ratios Dri read out from the map of FIG. 7 are applied with a restriction according to a routine shown in FIG. 4. Referring to FIG. 4, in step 310 it is judged if the target overall slip ratio Rsall is not zero. If the answer is no, this routine is immediately passed. If the answer of step 310 is yes, in step 320 it is judged if the target slip ratio Rsfo for the front wheel at the outside of the turn is not zero. If the answer is no, this routine is also immediately passed. If the answer of step 320 is yes, then in step 330 it is judged if the duty ratio Drfr calculated in step 230 for the front right wheel is greater than a predetermined limit value Dro. If the answer is yes, the duty ratio of the front right wheel Drfr is limited to a value Dro, presuming that the vehicle is making a left turn. If the answer of step 330 is no, then in step 350 it is judged of the duty ratio Drfl calculated in step 230 for the front left wheel is greater than the predetermined value Dro. If the answer is yes, the duty ratio Drfl for the front left wheel is limited to the value Dro, presuming that the vehicle is making a right turn. Therefore, regardless whether the vehicle is making a left turn or a right turn at such a high rate that the absolute value of the duty ratio Dri read out from the map shown in FIG. 7 based upon the slip rate SPi exceeds a desirable limit level such as Dro, the duty ratio is limited not to exceed Dro.

Figure 8:
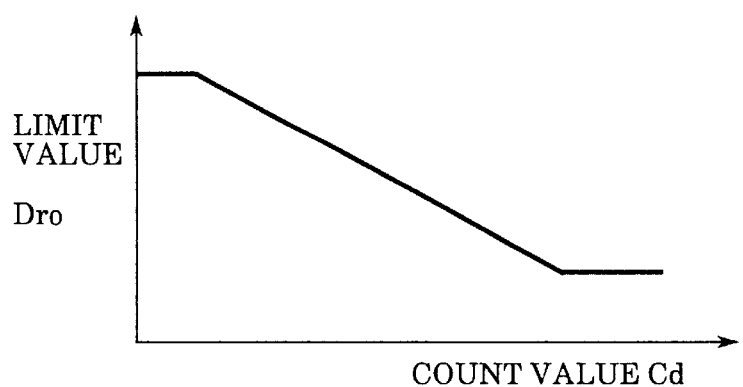
FIG. 8 is a map showing the relationship between the count value Cd and the limit value Dro.

The limit value Dro may be a constant value but may also be gradually decreased according to count value Cd as shown in FIG. 8. As will be appreciated from FIG. 8, in such a modification, after the lapse of the transient time designed by the value of m, n and Kd described above, the maximum duty ratio Dro is substantially changed such that the uprise rate of the braking force is correspondingly changed according to whether the stability control is carried out according to Rssp or Rsspdf.

In step 250, the control valves 50FL, 50FR, 28 and 44 are changed over to the respective second position, and the series of the normally open type on-off valves and the normally closed type on-off valves, 54FL–56FL, 54FR–56FR, 60RL–62RL and 60RR–62RR, are controlled according to the respective duty ratios Dri, so that a selected one or ones of the front left and right wheels and the rear left and right wheels are applied with a controlled braking force as calculated hereinabove.

Figure 9:
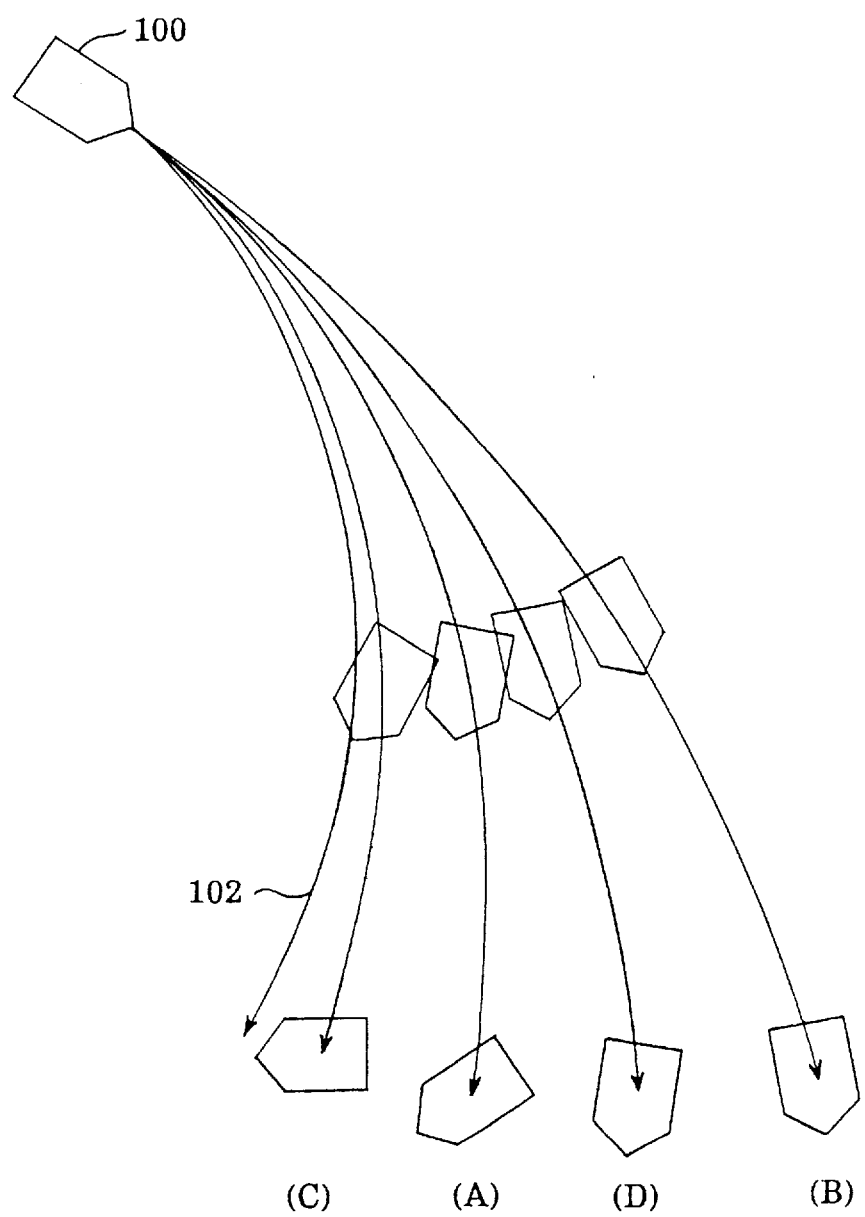
FIG. 9 is a diagram showing various behaviors of a vehicle during a turn running.

FIG. 9 illustrates how the stability of a vehicle 100 which makes a turn along a trace of case A with a spin and a drift-out with no particular stability control will change according to various stability controls. It is assumed the curve designated by 102 is the due trace for the vehicle 100. If the vehicle 100 has been applied with substantially only a spin suppress control, the vehicle will exhibit a behavior such as shown as case B, largely drifted out from the due trace 102, although the spinning has been well suppressed. On the other hand, if the vehicle 100 is applied with substantially only a drift-out suppress control, the vehicle will exhibit a behavior such as shown as case C, resulting in a high spin. In contrast, when the vehicle 100 is applied with the stability control of the present invention as described above, the vehicle will exhibit a behavior such as shown as case D, with the spin substantially suppressed without much sacrificing the drift-out suppress control by harmonizing the mutually contradictory performance of the spin suppress control and the drift-out suppress control.

Although the invention has been described in detail with respect to a preferred embodiment thereof, it will be apparent for those skilled in the art that various modifications are possible with respect to the shown embodiment without departing from the spirit of the present invention.

We claim:

1. A stability control device of a vehicle having a vehicle body, and front left, front right, rear left and rear right wheels, comprising:

means for estimating a liability of the vehicle body to spin for producing a spin quantity which generally increases along with an increase of the spin liability;

means for estimating a liability of the vehicle body to drift-out for producing a drift-out quantity which generally increases along with an increase of the drift-out liability;

brake means for selectively applying a variable braking force to each of said wheels; and control means for controlling said brake means so as to apply a variable braking force to a selected one or ones of said wheels for suppressing the vehicle body against spin and/or drift-out when the vehicle is driven along a curved course, wherein said control means controls said brake means such that a first braking force is applied to one of said front wheels located at the outside of a turn of the vehicle along the curved course according to an increase of said spin quantity, and a second braking force is applied to at least one of said rear wheels according to an increase of said drift-out quantity, said first braking force being decreased according to a simultaneous application of said second braking force to said at least one rear wheel.

2. A stability control device according to claim 1, wherein said first braking force is applied to the front wheel at the outside of the turn at an uprise rate which is lowered from a first value adopted when said second braking force is not simultaneously applied to a second value adopted when said second braking force is simultaneously applied.

3. A stability control device according to claim 1, wherein said first braking force is applied to the front wheel at the outside of the turn starting earlier against the increase of said spin quantity when said second braking force is simultaneously applied than when said second braking force is not simultaneously applied.

4. A stability control device according to claim 1, wherein said control means calculates an overall slip ratio of said front left, front right, rear left and rear right wheels to be effected therein by braking according to the magnitude of said drift-out quantity, said control means also calculating a slip ratio of the front wheel at the outside of the turn to be effected therein by braking according to the magnitude of said spin quantity, said control means controlling said brake means such that the front wheel at the outside of the turn is braked to effect the slip ratio calculated therefor, while said at least one rear wheel is braked to effect a difference of said overall slip ratio relative to said slip ratio calculated for the front wheel at the outside of the turn.

* * * * *